Aug. 26, 1952     L. F. KNIGHT ET AL     2,608,108
CONNECTING ROD ASSEMBLY

Original Filed Dec. 10, 1949     3 Sheets-Sheet 1

Inventors
LORNE F. KNIGHT
JACK L. H. EVERITT
By: Fetherstonhaugh & Co.
Att'ys.

Patented Aug. 26, 1952

2,608,108

UNITED STATES PATENT OFFICE 2,608,108

CONNECTING ROD ASSEMBLY

Lorne F. Knight and Jack L. H. Everitt, Toronto, Ontario, Canada, assignors to Massey-Harris Co. Ltd., Toronto, Ontario, Canada Continuation of application Serial No. 132,238, December 10, 1949. This application July 15, 1950, Serial No. 173,972. In Canada December 6, 1949

6 Claims. (Cl. 74—580)

This invention relates to improvements in connecting rods for reciprocating engines, and specifically to a connecting rod which may be mounted with other connecting rods on the same crank pin whereby reciprocating engine cylinders may be located within the same transverse plane.

This application forms a continuation of our United States application Serial Number 132,238, filed December 10, 1949.

The particular problem to be solved in providing a connecting rod arrangement according to the invention involves bearing stresses. In prior proposals providing connecting rods acting from the same crank pin undue attention has been awarded to that portion of the connecting rod bearing which is only required to be subjected to the inertia forces of the masses of the piston in withdrawing the latter from top dead centre during the intake stroke. As a result, previous proposals have not provided a simple connecting rod of the class wherein a pair may be mounted on a common crank pin for operation in the same plane of a practical form which can be applied simply to the crank pin without disassembling either the crank shaft or crank pin.

It is a particular object of this invention to provide a connecting rod arrangement wherein a plurality of such rods may be mounted upon a common crank pin for operation in the same plane and wherein each of the rods embodies only a partial bearing surface.

Another object of the invention is to provide a connecting rod arrangment as above wherein the rods are held in mounted position upon the common crank pin by retaining means within which the bearing hub of each connecting rod is rotatable.

Other objects of the invention will be appreciated by a study of the following specification taken in conjunction with the accompanying drawings.

Figure 1:
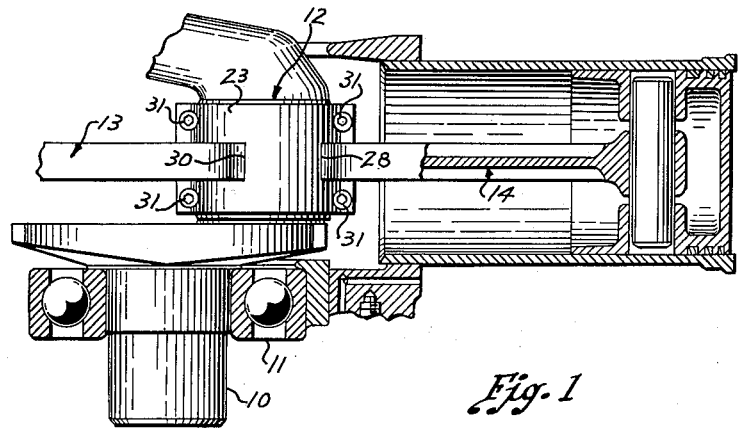
Figure 1 is a sectional view of a crank shaft and connecting rod mechanism according to the invention as employed in an opposed cylinder engine.

Referring to the drawings in more detail in Figure 1 a partial view of an opposed cylinder engine is shown having connecting rods mounted according to the invention. The opposed cylinder engine is little known in use by reason of the expensive requirements of manufacture in prior devices recommended for connecting rod mountings and also the disadvantages attendant in the necessity for dismantling the crank shaft in order to mount the connecting rods thereon. According to this invention, the crank rod 10 mounted on suitable bearings as at 11 mounts on a single crank pin in the region 12 thereof, a pair of connecting rods 13 and 14, in the opposed cylinder style of engine shown, so that these connecting rods have the same line of action within a common plane transverse of the axis of the crank shaft.

Figure 2:
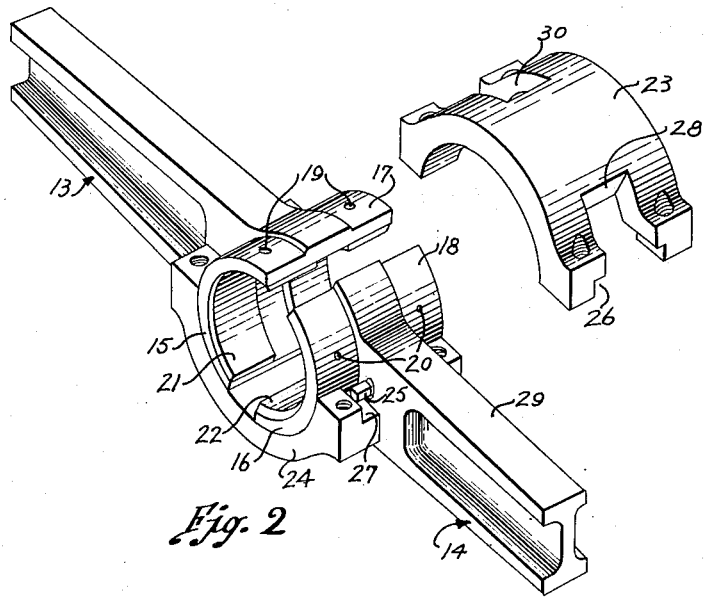
Figure 2 is a partial perspective view of connecting rods according to the invention with one component of one design of the retaining means removed.

Referring also to Figure 2, it will be observed that the connecting rods 13 and 14 have their crank pin bearing hubs 15 and 16 respectively formed to extend arcuately to present a bearing surface of limited area to the crank pin. Each bearing hub has an outer surface as at 17 and 18 in communication by suitable oil ducts 19 and 20 with the inner bearing liners 21 and 22, the duct passing through the liners into communication with the bearing surfaces of these bearings. The surfaces 17 and 18, hereinafter referred to as retaining surfaces, are movable within suitable retaining means such as the retaining or clamping components 23 and 24. One of the connecting rods such as the connecting rod 14 preferably embodies a retaining stud 25 which extends to engage in recesses 26 and 27 in the components 23 and 24. Each of the latter is cut away as at 28 to allow passage of the arm portion 29 of the rod 14, but the stud 25 serves to limit movement of the rod 14 within the retaining means 23 and 24 when the latter are clamped together about the hub portion of the rod.

The other rod 13 is slidable within the retaining means rotatably with respect to the rod 29 by reason of the larger cut away portions 30 allowing more movement. The retaining means such as components 23 and 24 may be fastened together to mount the bearing hubs of the rods on the connecting pin by suitable socket head screws 31 as illustrated in Figure 1.

It will be appreciated that due to the relative radial movement of one connecting rod with respect to the other, clearance must be provided in the terminal ends of these hubs as set forth in detail hereinafter.

Figure 4:
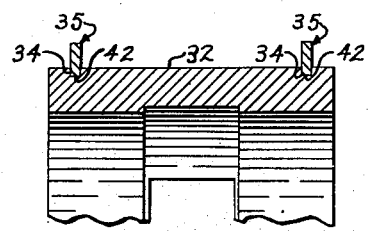
Figure 4 is a view 4—4 of Figure 3.
Figure 3:
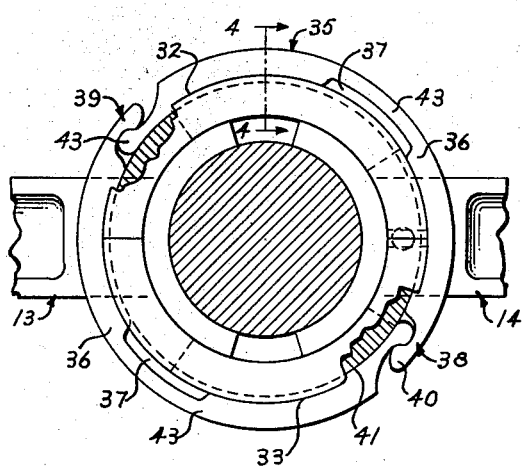
Figure 3 is a view of the bearing hubs of a pair of connecting rods according to the invention retained upon a common crank pin by a modified form of retaining means.

In Figures 3 and 4 an alternative in respect to the specific form of the retaining means is shown. In this case, the connecting rods 13 and 14 are held within retaining means in the form of a pair of simple semi-circular clamping components 32 and 33. Each of the components such as the component 32 shown in section in Figure 5, has suitable recesses 34 therein to accommodate retaining rings 35 of known form.

Each of the portions 36 of the complete ring 35 illustrated in Figure 3 is stamped from spring-like material and has a cut away clearance portion as at 37. The terminal ends 38 and 39 of each component are formed in opposite manner having a locking portion 40. The inner arcuate surface 41 of the component is formed to a predetermined diameter to which the inner surface 42 of each recess 34 is machined with small tolerance. In its natural form each component is fashioned so that it must be spread for the inner surface diameter to be true and by reason of the spring-like nature of the material, and taking into account the reduced body portion 43, the component grips into the recess tenaciously when engaged with the cooperating component to provide an effective locked retaining ring.

If desired, a bearing surface may be provided between the outer surfaces of the bearing hub portions of the rods and the inner surfaces of the retaining means. However, where ducts are provided in the bearing hubs to supply oil to these surfaces, special precautions normally will not be required in regard to supplying suitable bearing metal in these inner faces by reason of the limited movement and the limited stress conditions so long as reasonable lubrication is provided on these surfaces. Considerations in this respect will be determined by the operating conditions and the metals employed in the manufacture of the components.

The limitation of the application of the invention to more than the number of cylinders mentioned herein in a single planar arrangement will be dictated by bearing load requirements.

In essence the connecting rod of the invention comprises a crank pin end having a theoretical arcuate bearing extent equal to one-half of the minimum included angles which the connecting rod makes with adjacent connecting rods. Thus, referring to Figure 5, a connecting rod arrangement of the invention is shown wherein a common crank pin 44 mounts a plurality of rods 45, 46 and 47 acting upon the pistons 48, 49 and 50. The crank pin 44 moves on the circular path 51 of radius R as determined by the proportions of the crank shaft. The pistons move along the cylinder axis lines 52, 53 and 54.

Figure 5:
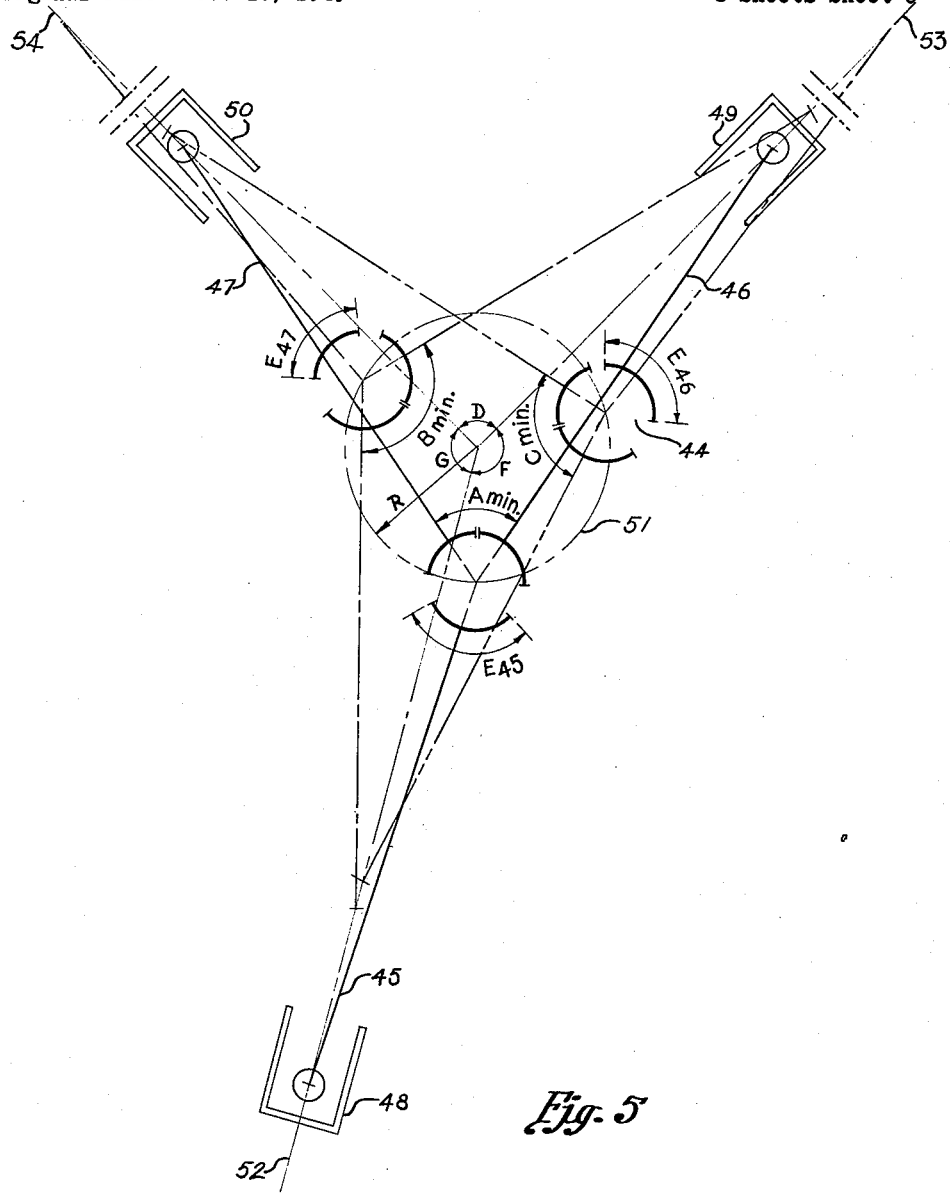
Figure 5 is a diagrammatic showing of the action of connecting rods of the invention referred to in the derivation of the general formula for bearing area.

In order to determine the total value of arcuate bearing extent for each connecting rod hub it is necessary to find the bearing hub extent on either side of each rod toward the adjacent connecting rod. In Figure 5, in determining the total value of arcuate bearing surface extent for the connecting rod 46 the minimum values of the adjacent included angles which this connecting rod makes with the connecting rods 45 and 47 are relevant. Thus $$E_{46} = \tfrac{1}{2}A \text{ min.} + \tfrac{1}{2}B \text{ min.} \tag{1}$$

Similarly $$E_{45} = \tfrac{1}{2}B \text{ min.} + \tfrac{1}{2}C \text{ min.} \tag{2}$$

and $$E_{47} = \tfrac{1}{2}C \text{ min.} + \tfrac{1}{2}A \text{ min.} \tag{3}$$

If desired these values may be found by plotting substantially as indicated in the diagrammatic illustration of Figure 5. However, it is preferred that the values be determined by calculation according to the following procedure.

In determining the formulation, the included angles between the cylinder axis lines are taken into account. Thus, $$\tfrac{1}{2}A \text{ min.} = \frac{D}{2} - \sin^{-1}\frac{R}{l}\sin\frac{D}{2} \tag{4}$$

where R is the crank radius and $l$ is the length of the connecting rod between its centres of action. Similarly, $$\tfrac{1}{2}B \text{ min.} = \frac{F}{2} - \sin^{-1}\frac{R}{l}\sin\frac{F}{2} \tag{5}$$

Also, $$\tfrac{1}{2}C \text{ min.} = \frac{G}{2} - \sin^{-1}\frac{R}{l}\sin\frac{G}{2} \tag{6}$$

Substitution of these values in Formulas 1, 2 and 3 give the required values of bearing extent for each connecting rod.

In the case of only two pistons which are opposed in an opposed cylinder engine, the formula for each bearing hub reduces to $$E = 180° - 2\sin^{-1}\frac{R}{l} \tag{7}$$

In actual practice the value of E is considered the theoretical maximum allowable. Accordingly, this dimension is reduced for necessary working clearances.

In general, therefore, it will be observed that the bearing extent E of a connecting rod hub according to the invention has a maximum value which is a function of the included angles on either side thereof of adjacent cylinders. In all cases the bearing extent will be less than 180° by an amount termed herein "a free clearance dimension" wherein said free clearance dimension is a function of the said included angles of adjacent cylinders and including machine clearance dimensions.

Many departures in the specific form of construction will be evident to skilled persons apart from those disclosed specifically herein to illustrate the invention. It is therefore intended that this disclosure should not be construed in any limiting sense aside from that indicated by the scope of the following claims.

What we claim as our invention is:

1. A connecting rod assembly comprising in combination: a plurality of connecting rods of identical form and length, each having an arm terminating at the crank pin end in a bearing hub projecting outwardly on either side of the arm to present outer bearing surfaces, inner bearing surfaces formed on said bearing hub of an arcuate extent providing clearance allowing for predetermined radial movement of the connecting rods each with respect to the other, a separable member formed of parts extending over and encircling the bearing hubs of the connecting rods and having bearing surfaces engaging the outer bearing surfaces of the projecting portions of the bearing hubs to confine the connecting rods to a common axis of pivotal movement, openings in said encircling member for free passage of the arms of the connecting rods therethrough, a socket formed in said encircling member at the junction of two of said parts, a stud mountable in one of said connecting rods engageable with said socket to cause the encircling member to move with the connecting rod, and means for retaining the parts of the separable member in assembly about said bearing hubs.

2. A connecting rod assembly comprising in combination: a plurality of connecting rods of identical form and length, each having an arm terminating at the crank pin end in a bearing hub projecting outwardly on either side of the arm to present outer bearing surfaces, inner bearing surfaces formed on said bearing hub of an arcuate extent providing clearance allowing for predetermined radial movement of the connecting rods each with respect to the other, a separable member formed of parts extending over and encircling the bearing hubs of the connecting rods and having bearing surfaces engaging the outer bearing surfaces of the projecting portions of the bearing hubs to confine the connecting rods to a common axis of pivotal movement, openings in said encircling member for free passage of the arms of the connecting rods therethrough, a socket formed in said encircling member at the junction of two of said parts, a stud mountable in one of said connecting rods engageable with said socket to cause the encircling member to move with the connecting rod, means for retaining the parts of the separable member in assembly about said bearing hubs, a pair of bearing liners constituting the inner bearing surfaces of said bearing hub, and means supporting said bearing liners in spaced apart relation within said bearing hub.

3. A connecting rod assembly comprising in combination: a plurality of connecting rods of identical form and length, each having an arm terminating at the crank pin end in a bearing hub projecting outwardly on either side of the arm to present outer bearing surfaces, inner bearing surfaces formed on said bearing hub of an arcuate extent providing clearance allowing for predetermined radial movement of the connecting rods each with respect to the other, a separable member formed of parts extending over and encircling the bearing hubs of the connecting rods and having bearing surfaces engaging the outer bearing surfaces of the projecting portions of the bearing hubs to confine the connecting rods to a common axis of pivotal movement, openings in said encircling member for free passage of the arms of the connecting rods therethrough, a socket formed in said encircling member at the junction of two of said parts, a stud mountable in one of said connecting rods engageable with said socket to cause the encircling member to move with the connecting rod, and bolt means extending between said parts of the separable member for retaining the same in assembly about said bearing hubs.

4. A connecting rod assembly comprising in combination: a plurality of connecting rods of identical form and length, each having an arm terminating at the crank pin end in a bearing hub projecting outwardly on either side of the arm to present outer bearing surfaces, inner bearing surfaces formed on said bearing hub of an arcuate extent providing clearance allowing for predetermined radial movement of the connecting rods each with respect to the other, a separable member formed of parts extending over and encircling the bearing hubs of the connecting rods and having bearing surfaces engaging the outer bearing surfaces of the projecting portions of the bearing hubs to confine the connecting rods to a common axis of pivotal movement, openings in said encircling member for free passage of the arms of the connecting rods therethrough, a socket formed in said encircling member at the junction of two of said parts, a stud mountable in one of said connecting rods engageable with said socket to cause the encircling member to move with the connecting rod, bolt means extending between said parts of the separable member for retaining the same in assembly about said bearing hubs, a pair of bearing liners constituting the inner bearing surfaces of said bearing hub, and means supporting said bearing liners in spaced apart relation within said bearing hub.

5. A connecting rod assembly comprising in combination: a plurality of connecting rods of identical form and length, each having an arm terminating at the crank pin end in a bearing hub projecting outwardly on either side of the arm to present outer bearing surfaces, inner bearing surfaces formed on said bearing hub of an arcuate extent providing clearance allowing for predetermined radial movement of the connecting rods each with respect to the other, a separable member formed of parts extending over and encircling the bearing hubs of the connecting rods and having bearing surfaces engaging the outer bearing surfaces of the projecting portions of the bearing hubs to confine the connecting rods to a common axis of pivotal movement, openings in said encircling member for free passage of the arms of the connecting rods therethrough, a socket formed in said encircling member at the junction of two of said parts, a stud mountable in one of said connecting rods engageable with said socket to cause the encircling member to move with the connecting rod, and tensionable locking rings extending about said separable member for retaining the parts thereof in assembly about said bearing hubs.

6. A connecting rod assembly comprising in combination: a plurality of connecting rods of identical form and length, each having an arm terminating at the crank pin end in a bearing hub projecting outwardly on either side of the arm to present outer bearing surfaces, inner bearing surfaces formed on said bearing hub of an arcuate extent providing clearance allowing for predetermined radial movement of the connecting rods each with respect to the other, a separable member formed of parts extending over and encircling the bearing hubs of the connecting rods and having bearing surfaces engaging the outer bearing surfaces of the projecting portions of the bearing hubs to confine the connecting rods to a common axis of pivotal movement, openings in said encircling member for free passage of the arms of the connecting rods therethrough, a socket formed in said encircling member at the junction of two of said parts, a stud mountable in one of said connecting rods engageable with said socket to cause the encircling member to move with the connecting rod, tensionable locking rings extending about said separable member for retaining the parts thereof in assembly about said bearing hubs, a pair of bearing liners constituting the inner bearing surfaces of said bearing hub; and means supporting said bearing liners in spaced apart relation within said bearing hub.

LORNE F. KNIGHT.
JACK L. H. EVERITT.

REFERENCES CITED

The following references are of record in the file of this patent:

UNITED STATES PATENTS

| Number | Name | Date |
|---|---|---|
| 315,643 | Lynn et al. | Apr. 14, 1885 |
| 736,458 | Sturtevant | Aug. 18, 1903 |
| 1,783,698 | Brownback | Dec. 2, 1930 |
| 2,096,189 | Miller | Oct. 19, 1937 |
| 2,188,118 | Portmann | Jan. 23, 1940 |

FOREIGN PATENTS

| Number | Country | Date |
|---|---|---|
| 156,895 | Great Britain | Jan. 13, 1921 |